United States Patent
Chen (10) Patent No.: US 11,218,482 B2
(45) Date of Patent: Jan. 4, 2022

(54) TWO-WAY INFORMATION EXCHANGE SYSTEM AND METHOD OF USING THE SYSTEM

(71) Applicant: Among Net Co., Ltd., Taipei (TW)

(72) Inventor: Ching-Yun Chen, New Taipei (TW)

(73) Assignee: Among Net Co., Ltd., Taipei (TW)

( * ) Notice: Subject to any disclaimer, the term of this patent is extended or adjusted under 35 U.S.C. 154(b) by 513 days.

(21) Appl. No.: 16/326,861

(22) PCT Filed: Dec. 27, 2017

(86) PCT No.: PCT/CN2017/118985
§ 371 (c)(1),
(2) Date: Feb. 20, 2019

(87) PCT Pub. No.: WO2019/127096
PCT Pub. Date: Jul. 4, 2019

(65) Prior Publication Data
US 2021/0336957 A1    Oct. 28, 2021

(51) Int. Cl.
G06F 15/173    (2006.01)
H04L 29/06    (2006.01)
H04L 12/58    (2006.01)

(52) U.S. Cl.
CPC ............ *H04L 63/10* (2013.01); *H04L 51/046* (2013.01); *H04L 51/32* (2013.01); *H04L 63/08* (2013.01)

(58) Field of Classification Search
CPC ....... H04L 63/10; H04L 51/046; H04L 61/32; H04L 63/08

USPC ................ 709/224, 223, 206, 229
See application file for complete search history.

(56) References Cited

U.S. PATENT DOCUMENTS

| | | | |
|---|---|---|---|
| 2006/0282426 A1* | 12/2006 | Spears | G06Q 50/10 |
| 2007/0032240 A1* | 2/2007 | Finnegan | G06Q 30/0261 |
| | | | 455/445 |
| 2010/0145869 A1* | 6/2010 | Brown | G06Q 30/06 |
| | | | 705/319 |
| 2011/0138305 A1* | 6/2011 | Akai | G06Q 30/08 |
| | | | 715/753 |
| 2014/0279066 A1* | 9/2014 | Louis | H04L 51/02 |
| | | | 705/14.73 |

(Continued)

*Primary Examiner* — Kaylee J Huang
(74) *Attorney, Agent, or Firm* — Wang Law Firm, Inc.

(57) ABSTRACT

A two-way information exchange system, which allows a requesting client employing an intelligent communication device to conduct information exchange with a target client, includes a communication module, a memory module, an authentication module, a selection module, a central processing module, an evaluation module, and an authorization module. The central processing module can search for one online client meeting the exchange condition provided from the requesting client to be served as a primary target client, and search the memory module for one or more clients meeting the exchange condition to be served as false target clients. The central processing module can send the identity data of the target clients to the intelligent communication device, and receive/send exchange information between the clients. The evaluation module can evaluate a communication level between the clients and issue a privileged instruction to the authorization module, which informs the requesting client of obtaining a delete privilege.

9 Claims, 8 Drawing Sheets

(56) References Cited

U.S. PATENT DOCUMENTS

2015/0142839 A1\* 5/2015 Ochandio .............. G06Q 50/01
707/758

\* cited by examiner

FIG.8

TWO-WAY INFORMATION EXCHANGE SYSTEM AND METHOD OF USING THE SYSTEM

FIELD OF THE INVENTION

The present invention relates to a two-way information exchange system and a method of using the system.

BACKGROUND OF THE INVENTION

With the advent of the internet, communication between people is not limited by the place of residence. Everyone can immediately communicate with persons living in remote areas through the internet. Due to this trend, some internet software providers are rushing to exploit the characteristics of the network to offer a platform for allowing people to exchange information with each other, so as to increase the internet traffic flow and data of the web site and gather the activity tracks of users, from which detailed plans of future service can be obtained so as to discover a blue ocean market and proceed with a strategic layout. Generally, a platform for providing information exchange includes a database capable of storing data of multiple clients who want to interact with others, wherein a simple screening or selection mechanism can be used to select a target person for a client requesting an activity of information exchange.

However, in an activity of a common platform, due to ease of accessing information, communication between two persons cannot go deeper than ever. Because the simple screening mechanism employed in the common platform is based on the photos of clients, communication becomes superficial, and persons judge by appearance. Handsome men or pretty women, who do not know the intensions of their counterparts, may be disturbed. On the other hand, persons who do not have a good look may be ignored or rejected. Thus, the activity and addiction of users on the platform is limited. This phenomenon may cause a change on the behavior of a person. For example, persons with poor appearance may modify their photos to be more pleasing. Persons with good appearance may worry about the selection of their counterparts being based on their looks, and they do not know which one is the true friend.

In some internet software for making friends, the screening mechanism is implemented by asking questions when two persons are in the first contact. If the answers from a person match with the standard of the counterpart, the person may obtain the photo of the counterpart for further information exchange. The screening mechanism is too simple and cannot afford a two-way communication. In addition, a person may figure out the thought of the questioner or counterpart to give the answers which are expected by the questioner. Therefore, the questioner fails to know whether the person is a true friend or not.

To prevent persons from being limited or even rejected by their looks, the present invention provides a two-way information exchange system and a method of using the system, which can provide a fair platform for activities of information exchange. With the present invention, a client allows access to the counterpart only after the communication level between both parties has reached a predetermined threshold. This way can increase the communication depth between both parties before their identities are fully disclosed. Therefore, the friendship is built on a foundation of in-depth communication, so that the quality of information exchange between persons can be improved, the foregoing superficialness and problems existing in the era of internet popularization can be alleviated, and the shortcomings of conventional softwares for making friends can be overcome.

SUMMARY OF THE INVENTION

One object of the present invention is to provide a two-way information exchange system, wherein at least one false target client is selected together with a primary target client, so that the appearance of a client does not play an important role in making friends, and thus more fair information exchange can be achieved.

Another object of the present invention is to provide a two-way information exchange system, wherein a communication level between a requesting client and a primary target client can be evaluated and compared with a predetermined threshold, so that the overall communication depth between both parties can be increased.

A further object of the present invention is to provide a method of using a two-way information exchange system, wherein a communication level between a requesting client and a primary target client can be evaluated and compared with a predetermined threshold, so as to increase the communication depth between both parties, and the degree of mutual understanding.

A still further object of the present invention is to provide a method of using a two-way information exchange system, wherein at least one false target client is selected together with a primary target client, so that each party cannot immediately know which one is the true counterpart in an activity of information exchange, so that the habit of choice by appearance can be avoided, and more fair opportunities for information exchange can be provided.

The present invention discloses a two-way information exchange system, which allows a requesting client employing an intelligent communication device with at least one display screen to conduct information exchange with a target client. The system comprises a communication module, at least one memory module, an authentication module, a selection module, a central processing module, an evaluation module, and an authorization module. The communication module can be in signal connection with the intelligent communication device of the requesting client. The memory module can store identity data provided from a plurality of clients. The authentication module can authenticate the requesting client after the communication module is in signal connection with the intelligent communication device. The selection module can search for at least one client, who is online and meets at least one exchange condition provided from the requesting client, to be served as a primary target client, and can search the memory module for one or more clients, who are other than the primary target client and meet the exchange condition provided from the requesting client, to be served as one or more false target clients. The central processing module can send the identity data of the primary target client as well as the identity data of the false target clients by way of the communication module to the intelligent communication device, and can receive/send exchange information by way of the communication module between the requesting client and the primary target client. The evaluation module can evaluate a communication level between the requesting client and the primary target client, and can issue a privileged instruction when the communication level reaches a predetermined threshold. The authorization module allows a message to be sent to the intelligent communication device via the communication module to inform the requesting client of obtaining a delete privilege, and allows the message to be logged in the memory module, when receiving the privileged instruction issued from the evaluation module.

Furthermore, the present invention discloses a method of using a two-way information exchange system which allows a requesting client employing an intelligent communication device with at least one display screen to conduct information exchange with a target client, the system including a communication module for being in signal connection with the intelligent communication device, at least one memory module capable of storing identity data provided from a plurality of clients, an authentication module, a selection module, a central processing module, an evaluation module, and an authorization module, the method comprising:

(a) the communication module accepting a connection request from the intelligent communication device of the requesting client to establish a connection therebetween, and receiving the identity data of the requesting client from the intelligent communication device to be authenticated by the authentication module;

(b) the communication module receiving at least one exchange condition provided from the requesting client employing the intelligent communication device after the requesting client has been authenticated by the authentication module;

(c) the selection module searching for at least one client, who is online and meets the exchange condition, to be served as a primary target client, and searching the memory module for one or more clients, who are other than the primary target client and meet the exchange condition, to be served as one or more false target clients;

(d) the central processing module sending the identity data of the primary target client as well as the identity data of the false target clients by way of the communication module to the intelligent communication device, and receiving/sending exchange information by way of the communication module between the requesting client and the primary target client;

(e) the evaluation module capable of evaluating a communication level between the requesting client and the primary target client and, when the communication level reaches a predetermined threshold, issuing a privileged instruction to the authorization module, which allows a message to be sent to the intelligent communication device via the communication module to inform the requesting client of obtaining a delete privilege, and allows the message to be logged in the memory module; and (f) the central processing module deleting at least one of the false target clients and then sending the identity data of the remaining false target clients as well as the identity data of the primary target client to the intelligent communication device of the requesting client via the communication module when receiving a delete request from the requesting client obtaining the delete privilege.

The system and method of the present invention allows one or more false target clients to be selected together with a primary target client for a client requesting an activity of information exchange. As such, the requesting client cannot rely on the appearance to decide whether or not to continue the information exchange activity with the primary target client. For access to the primary target client, the communication level between the requesting client and the primary target client has to reach a threshold. As the amount of information transferred between both parties increases, the communication level therebetween increases. When the communication level reaches a threshold, one or more false target clients can be deleted. In this way, both parties can learn more about each other, and the habit of choosing a person by appearance can be weakened, thus increasing the depth of information exchange and achieving the purpose of two-way information exchange of the present invention.

BRIEF DESCRIPTION OF THE DRAWINGS

The foregoing and other features and advantages of illustrated embodiments of the present invention will be more readily apparent from the following detailed description, which proceeds with reference to the accompanying drawings.

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

The foregoing and other technical contents, features and advantages of the present invention will be illustrated in detail by way of exemplary embodiments with reference to the accompanying drawings. In the exemplary embodiments, same elements will be indicated by similar numerals or labels.

In today's society, due to rapid technological development and widespread of 3G communication technology, various mobile devices, such as smartphones, tablet computers, mobile terminals and so on, which are miniaturized and have become one of essential carry-on items, can be used to search data on web promptly and play games, and particularly, they can be used to communicate with friends and family around the world and share interesting things through the most interactive platforms, such as Weibo, QQ, Renren and WeChat. Some internet application providers have developed application software for making friends, such as iAround, Renren, Welove, Wanba, Pairs, i-Part, BeeTalk, and so on, so that persons engaged in talks via internet are not limited to their own circles of friends.

In using a commonly used internet application for dating or making friends, first of all, a user should upload his or her personal information, photos, and dating conditions to the server of the application after registering with and logging on the server. Next, the server of the application can search its database for persons who meet the dating conditions and can send the associated data to the mobile device of the user for allowing the user to select one person for communication. Since photos are the most common information of the persons sent to the user, if the photos of the persons are not attractive, the user may reject them. A user, who decides whether to go for a talk according to the appearance, may snub persons with normal or even poor looks, although they may have common interests perfectly fit for the user. On the other hand, persons with nice looks may worry about the selection of their counterparts being based on the appearance, and thus cannot trust their counterparts.

Due to users being likely to choose a person by appearance, it is difficult for persons who are not good at grooming or dressing up to have an opportunity to attend an activity of information exchange. Even though there is a match between two persons, the appearance of each person may cause an obstacle to communicate with each other. On the other hand, for persons with attractive appearance, it is advantageous for them to attend an activity of information exchange. However, it is difficult for them to know if the counterparts like them by appearance. There is a layer of suspicion and estrangement between two persons attending an activity of information exchange.

Figure 1:
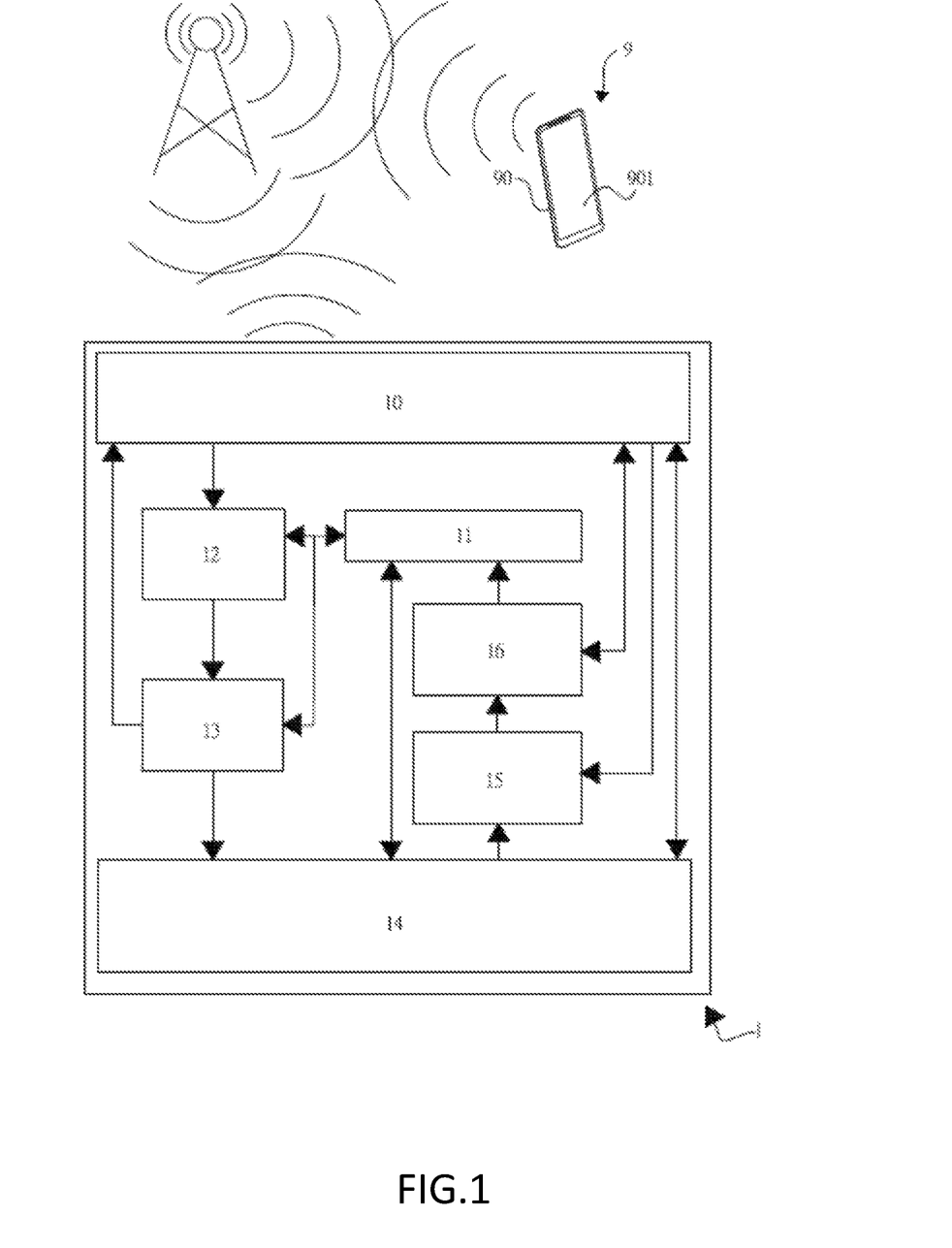
FIG. 1 shows a block diagram of a two-way information exchange system according to a first embodiment of the present invention, wherein multiple modules of the system are illustrated in view of functional relationship.
Figure 2:
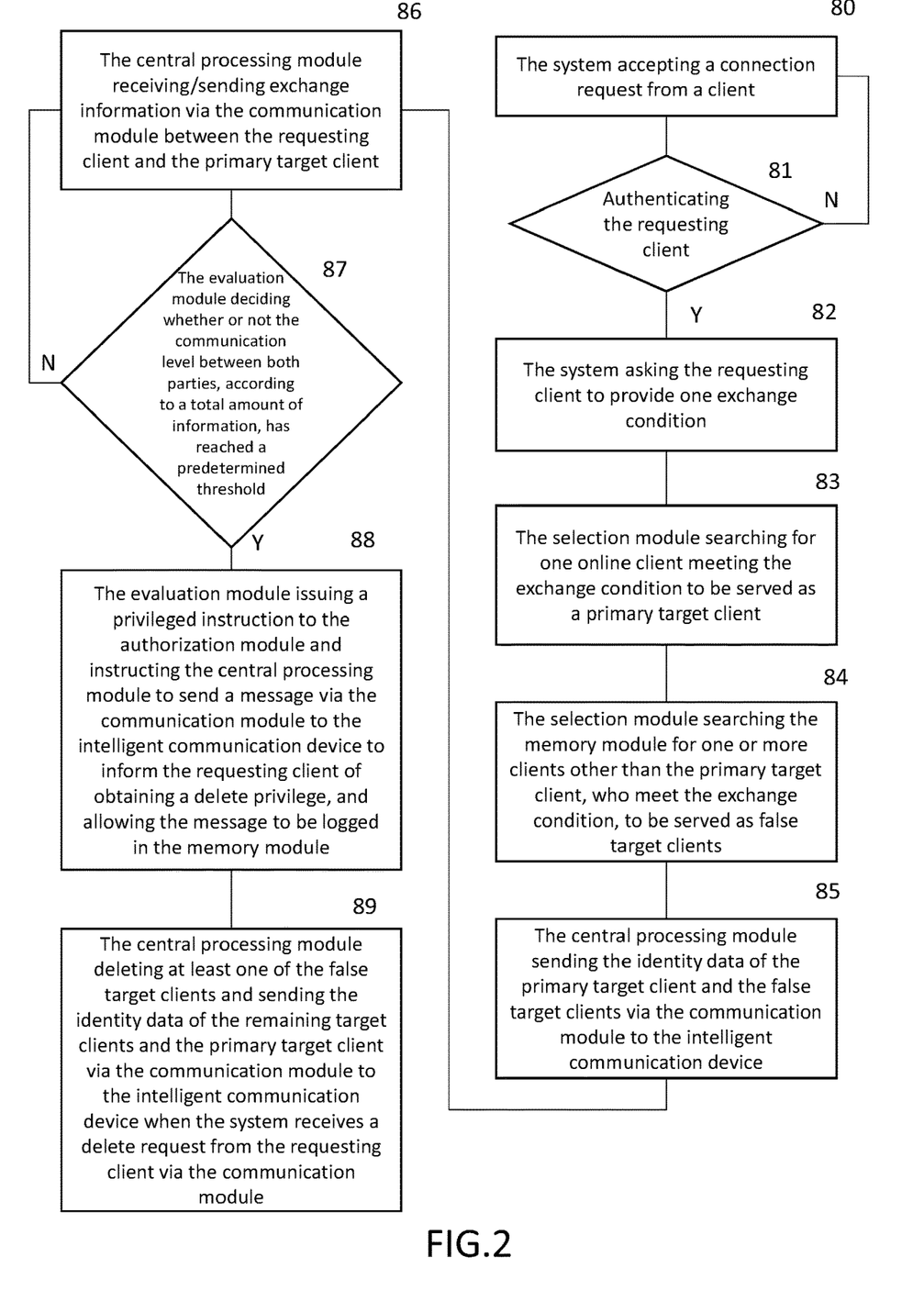
FIG. 2 shows a flowchart of a method of using the system of the first embodiment.
Figure 3:
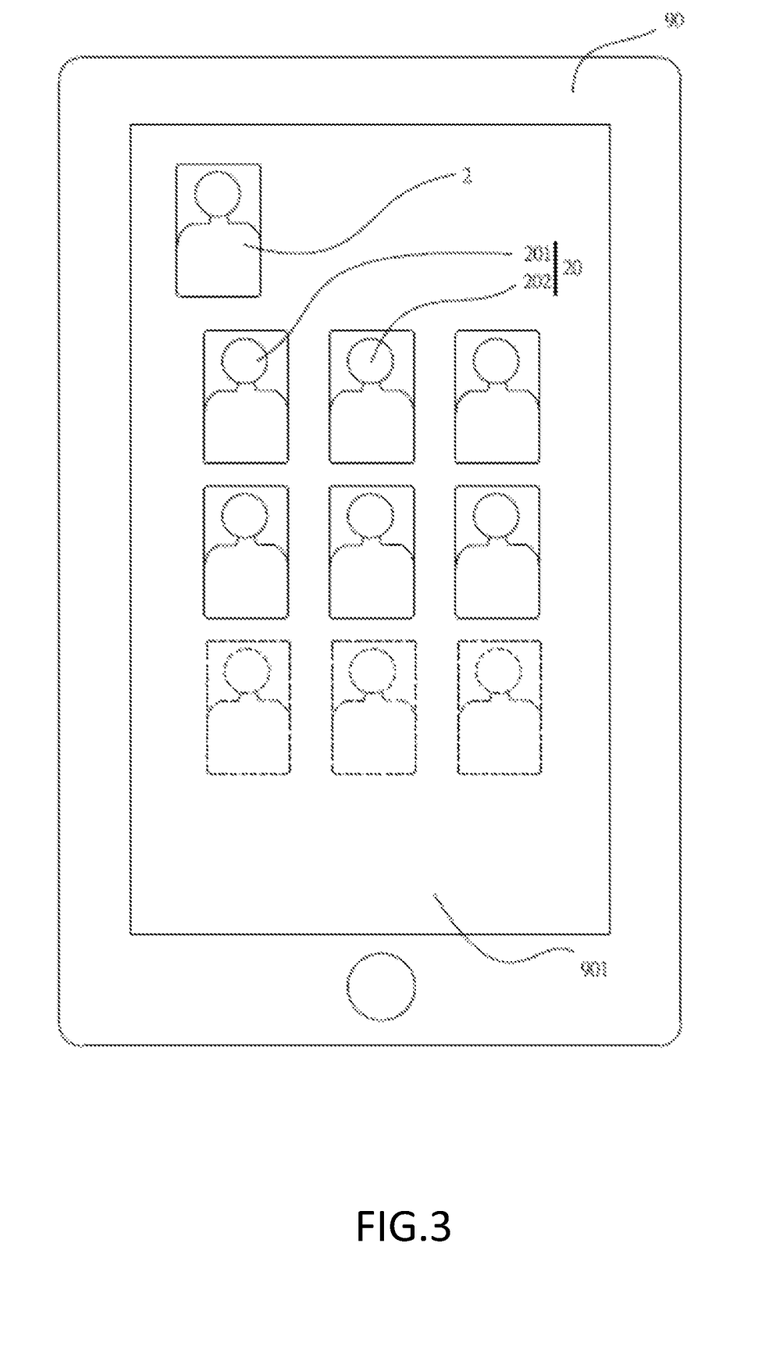
FIG. 3 shows a schematic view of an operation interface of an intelligent communication device used together with the system of the first embodiment.

To illustrate how the present invention mitigates the above disadvantages in existing platforms that provides service of information exchange, a first embodiment of the present invention is provided in the following paragraphs, illustrated with FIGS. 1, 2, and 3, wherein FIG. 1 shows a block diagram for a two-way information exchange system, FIG. 2 shows a flowchart of a method of using the system, and FIG. 3 shows a schematic view of an operation interface of the system.

In this embodiment, a user, who is looking for a target person, is referred to herein as a requesting client 2. In Step 80, the requesting client 2 at a client side 9 employs an intelligent communication device 90 to issue a connection request to a system 1, so that the intelligent communication device 90 can be in signal connection with a communication module 10 of the system 1, and then can send identity data and receive/send exchange information. The intelligent communication device 90, which can be interpreted as a smartphone, is equipped with at least one display screen 901 to show the information transferred via the communication module 10 to the intelligent communication device 90 of the requesting client 2. Of course, persons skilled in the art can easily understand that mobile devices can be a handheld device or mobile terminal, or a communication device in the form of a handheld tablet or laptop with a display screen and an input interface; communication devices can be a device provided with CDMA/3G or Wi-Fi unit so as to communicate with external devices. Thus, the intelligent communication device of this embodiment can be a laptop provided with a communication unit so that it can be connected with a hotspot.

If the requesting client 2 is a new user, the system 1 will request the client to send the identity data thereof to a memory module 11 of the system so as to create an identity record associated with the requesting client. In the present invention, all clients excluding the requesting client 2 are referred to as target clients 20. The memory module 11 can save the identity data of the requesting client 2 and all of the target clients 20. After registering with the system 1, for entering the system 1 again, the requesting client 2 at the client side 9 should provide the system 1 via the intelligent communication device 90 with data, such as the identification name, photos, and password, which can be authenticated by the authentication module 12, at which the input data of the requesting client 2 with the identity record saved in the memory module 11 (see Step 81).

If the requesting client 2 passes the authentication process (Step 81), the selection module 13 can read the information of exchange condition provided from the requesting client 2 (Step 82). On the other hand, if the requesting client 2 does not pass the authentication process, the requesting client 2 will be requested to re-enter the identity data (Step 80) or open a new account, and then Step 81 can be executed again. Thereafter, Steps 83 and 84 conduct a selection process according to the exchange condition, such as gender, age range, or place of residence provided from the requesting client 2, wherein one target client 20 meeting the exchange condition can be selected from online users of the system to be a primary target client 201, and furthermore, one or more clients other than the primary target 201 while meeting the exchange condition can be selected as one or more false target clients 202 by searching the memory module 11. Of course, persons skilled in the art can easily understand that the exchange condition provided from the requesting client 2 can be widened slightly if no target client is available. For example, the exchange condition "age range 19-20" can be widened as "18-21", so that at least one target client can be selected. Such widening of the exchange condition does not hinder implementation of this embodiment.

In Step 85, the central processing module 14 sends the identity data of the primary target client 201 as well as the identity data of the false target clients 202 via the communication module 10 to the intelligent communication device 90. Consequently, as shown in FIG. 3, the intelligent communication device 90 can show one image or avatar of the primary target client 201 and eight images or avatars of the false target clients 202 on its display screen 901. It is noticed that the requesting client 2 does not know which one is the primary target client 201 at this stage. Through the communication module 10, the exchange information from the intelligent communication device 90 can be transferred to the communication device of the primary target client 201. Also, the exchange information from the communication device of the primary target client 201 can be transferred to the intelligent communication device 90 of the requesting client 2. As such, under the habit of choosing a person by appearance, if there is one client with attractive appearance existing in the group of the target clients 20, the requesting client 2 may wish to continue the activity of information exchange.

In step 86, the evaluation module 15 can calculate the amount of information transferred between both parites to evaluate a communication level therebetween over a period in which the requesting client 2 talks with the primary target client 201. When the amount of information reaches a predetermined threshold (Step 87), the evaluation module 15 can issue a privileged instruction to an authorization module 16. In Step 88, the authorization module 16 allows a message to be sent to the intelligent communication device 90 via the communication module 10 to inform the requesting client 2 of obtaining a delete privilege, and allows the message to be logged in the memory module 11, so that the requesting client 2 is entitled to delete one of the false target clients 202 to approach the primary target client 201.

In Step 89, when the system receives a delete request from the requesting client 2 via the communication module 10, the central processing module 14 can delete at least one of the false target clients 202, and send the identity data of the remaining seven target clients 202 and the identity data of the primary target client 201 via the communication module 10 to the intelligent communication device 90. As a result, there will be eight images in total shown on the display screen 901 of the intelligent communication device 90. Since there are more than one false target client, the requesting client 2 may delete the false target clients one by one by issuing a delete request at a time. As shown in FIG. 3, there are three target clients, shown by dashed lines, being deleted. Alternatively, delete privileges can be saved or accumulated such that the requesting client 2 may delete the remaining false target clients at one time to expose the primary target client.

Figure 4:
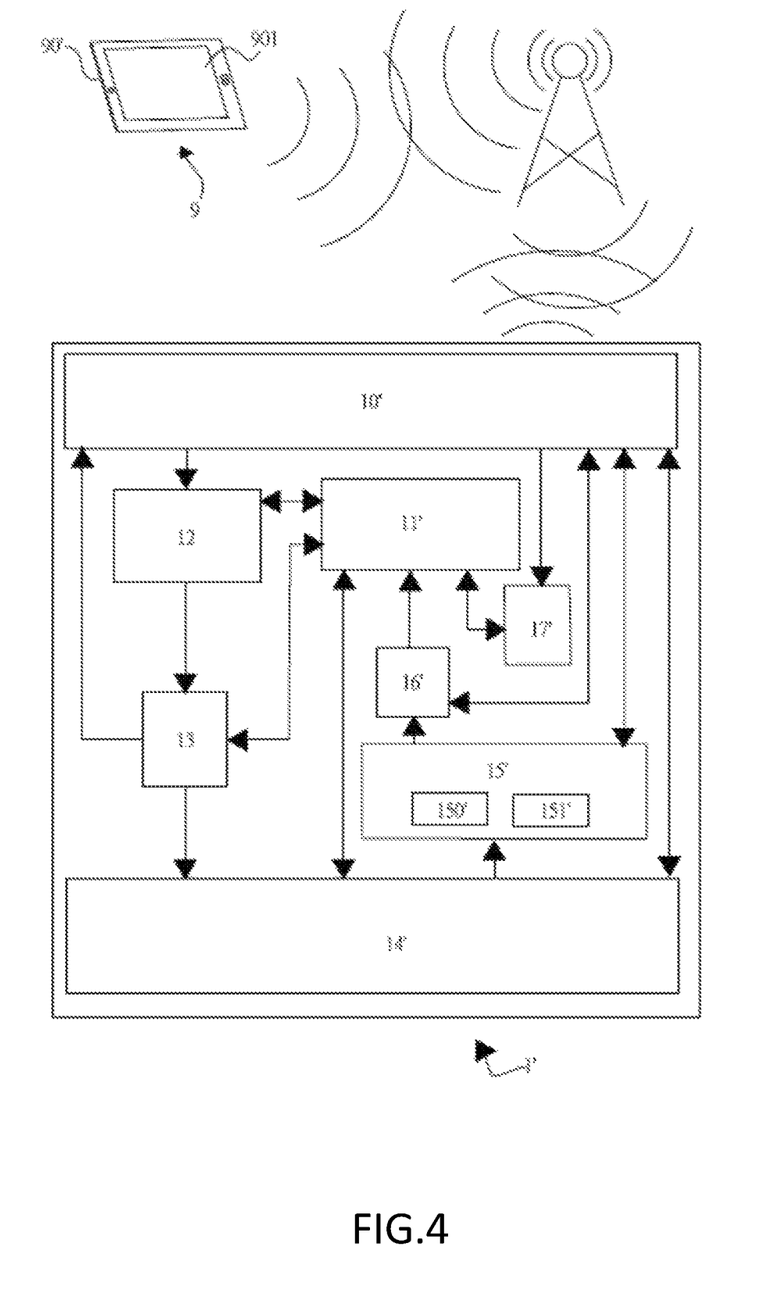
FIG. 4 shows a block diagram of a two-way information exchange system according to a second embodiment of the present invention.
Figure 5:
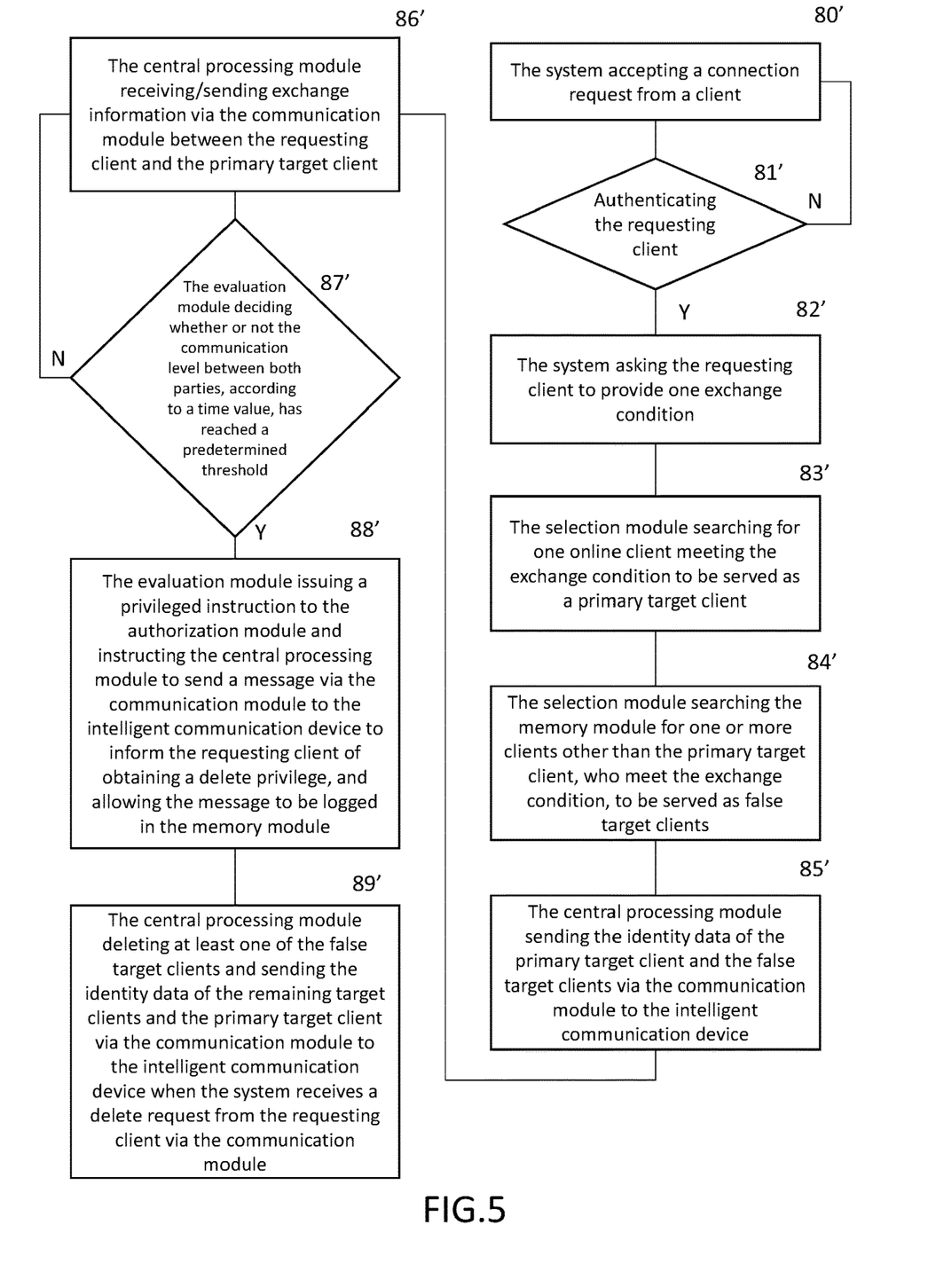
FIG. 5 shows a flowchart of a method of using the system of the second embodiment.

FIGS. 4 and 5 show a second embodiment of the present invention, wherein Steps 80'-86' are same as Steps 80-86 of the previous embodiment. This embodiment is different from the previous embodiment in the unit of the threshold with which the communication level between both parties can be compared. In this embodiment, the evaluation module 15' includes a clock unit 150' and a time calculation unit 151'. The clock unit 150' can generate periodic pulses, which serves as a basis for calculating that time span of an activity. In Step 87', the time calculation unit 151' can count the pulses generated by the clock unit 150' over a period, in which the requesting client 2 communicates with the primary target clients 201, to obtain a time value, which is an indication of the communication level between both parites. Also, the evaluation module 15' can check the time value to make sure if the value has reached the predetermined threshold so that a privileged instruction can be issued. In Step 88', a privileged instruction is issued as the previous embodiment. In Step 89', a request from the requesting client for deleting at least one of the false target clients is executed as the previous embodiment.

In addition, this embodiment further includes a point counting module 17', which can modify the communication level between both parties. Through Step 87', the evaluation module 15' can issue a privileged instruction to the authorization module 16', which in turn can issue an instruction to the central processing module 14' to send a message via the communication module 10' to the intelligent communication device 90, informing the requesting client of obtaining a delete privilege.

As the depth of a talk between both parties increases, the requesting client may be eager to make sure which one is the primary target client. For this reason, the requesting client may use points thereof to give the primary target client a non-physical or physical item. A non-physical item can be an image shown on the display screen of an intelligent communication device. The use of a non-physical item allows the communication level or time length of an information exchange activity between both parites to be increased, so that the communication level can reach a predetermined threshold more quickly, and thus the false target clients can be deleted more quickly. While the requesting client is using points, the point counting module 17' can make calculation and instruct the memory module 11' to conduct addition or subtraction for the points associated with the requesting client, so that the points can be converted into corresponding items to facilitate interactive communication, and the information exchange activity between both parties can be continued. Alternatively, the requesting client can obtain a delete privilege by consuming some points at one time, or even expose the primary target client by consuming a lot of points; however, the acquisition of delete privileges by directly consuming points is not preferable, because the system of the present invention expects deep communication between both parties before the primary target client is exposed. It is preferred that the acquisition of a delete privilege is based on an interaction between both parites. During the interaction, the points owned by the requesting client can be converted into a non-physical or physical item, or an online interactive game, such as "mora", "gomoku", "you draw me guess", which can facilitate interaction between both parties. Nevertheless, acquisition of delete privileges by directly consuming points does not hinder implementation of this embodiment.

Figure 6:
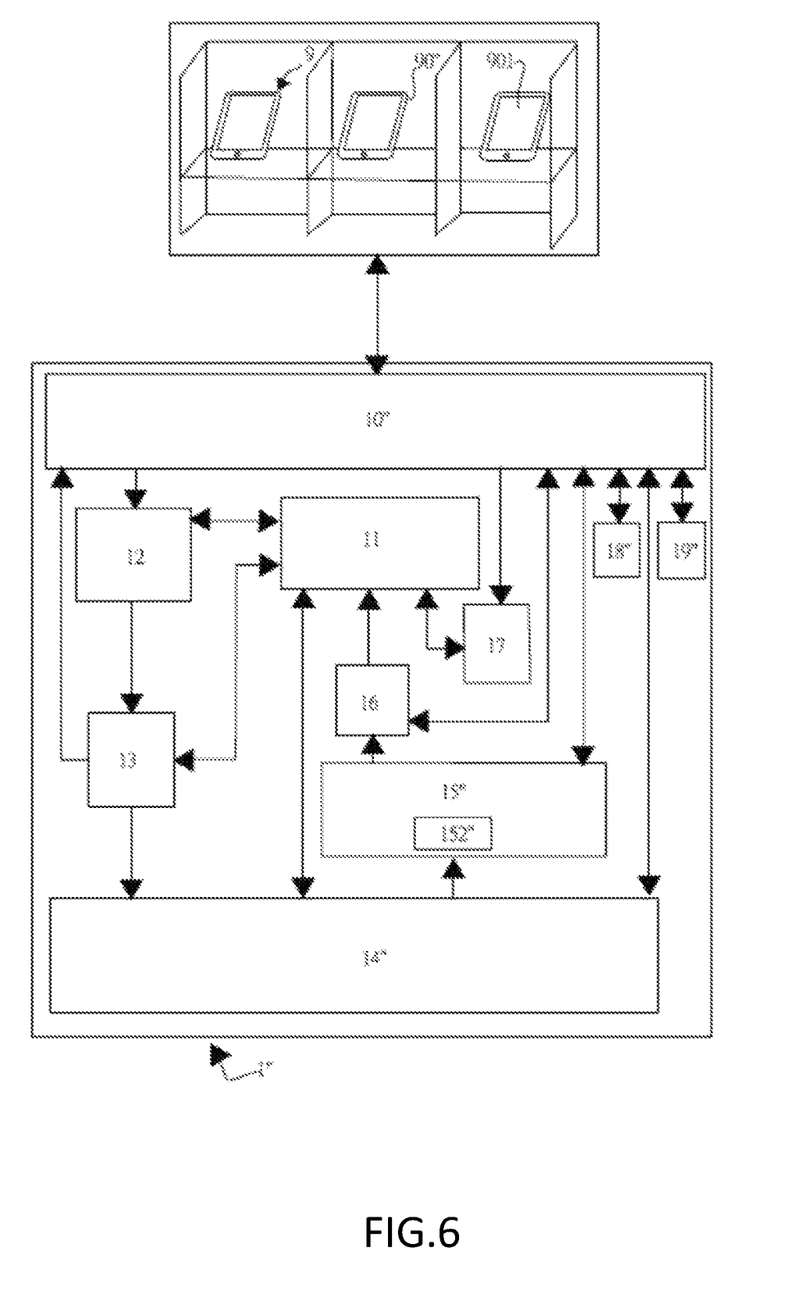
FIG. 6 shows a block diagram of a two-way information exchange system according to a third embodiment of the present invention.
Figure 7:
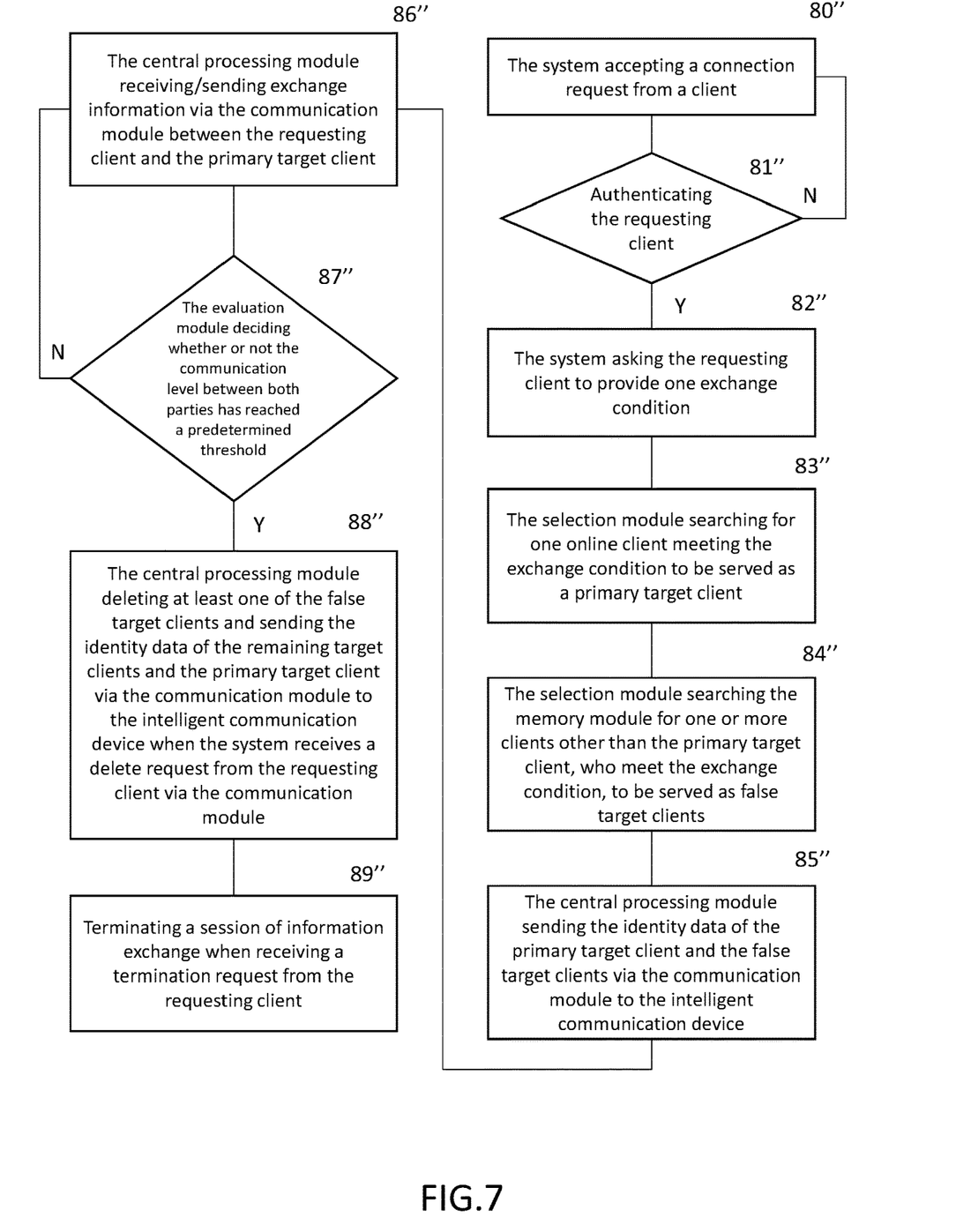
FIG. 7 shows a flowchart of a method of using the system of the third embodiment.

FIGS. 6 and 7 show a third embodiment of the present invention, wherein the evaluation module 15" includes an information counting unit 152", which can count pieces of exchange information to obtain the amount of information transferred between the requesting client and the primary target client, which can be compared with a predetermined threshold, as illustrated in the first embodiment. In this embodiment, the system 1" further includes a termination module 18" and a restoration module 19". In a session of information exchange, if one party feels the counterpart is uncongenial or does not receive an immediate response from the counterpart, the party can issue a termination request via the intelligent communication device 90" to the termination module 18" of the system 1". In Step 89", when the termination module 18" receives a termination request, upon a shutdown of the intelligent communication device 90", the session of information exchange can be terminated.

Figure 8:
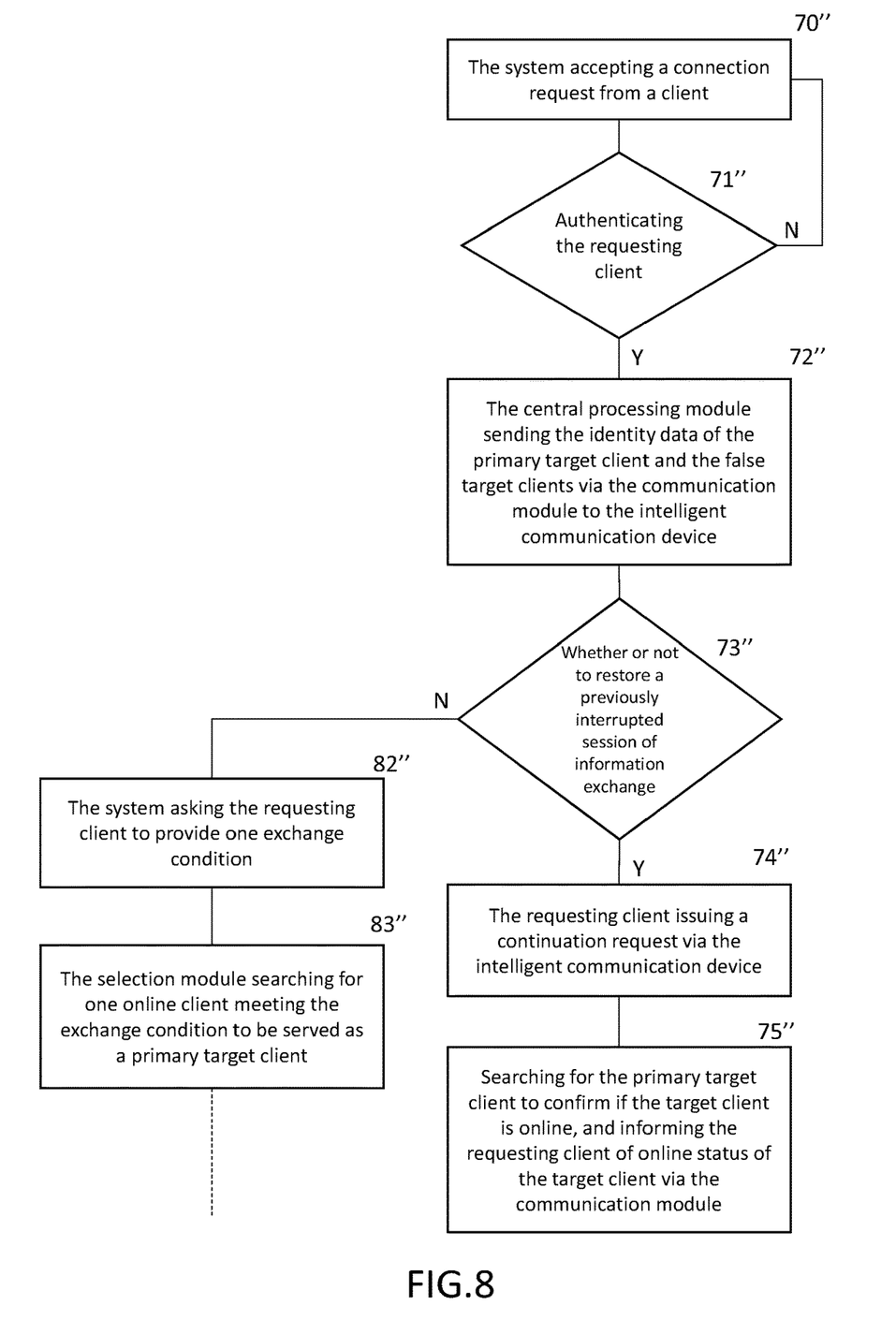
FIG. 8 shows a flowchart of the method of using the system of the third embodiment, wherein termination and recovery executing steps for an interrupted session of information exchange between two parties are detailed.

A communication interruption can be resulted from the requesting client entering an elevator or signal weak area except for manually cutting off the communication function of the intelligent communication device 90". For an accidental interruption, the requesting client may continue the previously interrupted session of information exchange after the system is again in connection with the device. As shown in FIG. 8, after the intelligent communication device 90" is again in signal connection with the communication module 10" of the system 1", the central processing module 14" will inquire of the requesting client via the communication module 10" whether or not to continue the previously interrupted session of information exchange (Step 73"). If the system receives a reply from the client for continuing the previously interrupted session of information exchange via the communication module 10", the restoration module 19" will be informed, and the communication module 10" will be instructed to inform the requesting client of the primary target client having logged on the system when the primary target client is in connection with the system. Therefore, the previously interrupted session of information exchange between both parties can be continued. If the requesting client rejects to continue the interrupted session, the system 1" can search for other online users, who meet the exchange condition, to open a new session of two-way information exchange (Steps 82" and 83").

Of course, those skilled in the art may provide the system with a function, in which deletion of the false target clients can be accelerated by directly consuming the points owned by the requesting client. While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the scope of the invention.

What is claimed is:
1. A two-way information exchange system, which allows a requesting client employing an intelligent communication device with at least one display screen to conduct information exchange with a target client, the system comprises:
- a communication module for being in signal connection with the intelligent communication device;
- at least one memory module for storing identity data provided from a plurality of clients;
- an authentication module capable of authenticating the requesting client after the communication module is in signal connection with the intelligent communication device;
- a selection module capable of searching for at least one client, who is online and meets at least one exchange condition provided from the requesting client having been authenticated, to be served as a primary target client, and searching the memory module for one or more clients, who are other than the primary target client and meet the exchange condition provided from the requesting client having been authenticated, to be served as one or more false target clients;
- a central processing module capable of sending identity data of the primary target client as well as identity data of the false target clients by way of the communication module to the intelligent communication device, and receiving/sending exchange information by way of the communication module between the requesting client and the primary target client;
- an evaluation module capable of evaluating a communication level between the requesting client and the primary target client, and issuing a privileged instruction when the communication level reaches a predetermined threshold; and
- an authorization module for allowing a message to be sent to the intelligent communication device via the communication module to inform the requesting client of obtaining a delete privilege, and allowing the message to be logged in the memory module, when receiving the privileged instruction issued from the evaluation module;
- wherein the central processing module deletes at least one of the false target clients and sends the identity data of the remaining false target clients as well as the identity data of the primary target client to the intelligent communication device of the requesting client via the communication module when receiving a delete request from the requesting client obtaining the delete privilege.

2. The two-way information exchange system of claim 1, further comprising a point counting module capable of issuing an instruction to the memory module to perform addition or subtraction for points owned by the requesting client.

3. The two-way information exchange system of claim 1, wherein the evaluation module includes a clock unit capable of generating periodic pulses, and a time calculation unit capable of counting the periodic pulses over a period, in which the requesting client communicates with the primary target client, to obtain a time value which indicates the communication level.

4. The two-way information exchange system of claim 1, wherein the evaluation module includes an information counting unit capable of counting pieces of information transferred between the requesting client and the primary target client to obtain a total amount of information, which indicates the communication level.

5. The two-way information exchange system of claim 1, further comprising a termination module capable of terminating a session of information exchange between the requesting client and the primary target client upon receiving a termination request from the requesting client via the communication module.

6. The two-way information exchange system of claim 5, further comprising a restoration module capable of searching for the primary target client and informing the requesting client of online status of the primary target client when the requesting client issues a continuation request via the intelligent communication device after the session of information exchange was terminated.

7. A method of using a two-way information exchange system which allows a requesting client employing an intelligent communication device with at least one display screen to conduct information exchange with a target client, the system including a communication module for being in signal connection with the intelligent communication device, at least one memory module capable of storing identity data provided from a plurality of clients, an authentication module, a selection module, a central processing module, an evaluation module, and an authorization module, the method comprising:
- (a) the communication module accepting a connection request from the intelligent communication device of the requesting client to establish a connection therebetween, and receiving identity data of the requesting client from the intelligent communication device to be authenticated by the authentication module;
- (b) the communication module receiving at least one exchange condition provided from the requesting client employing the intelligent communication device after the requesting client has been authenticated by the authentication module;
- (c) the selection module searching for at least one client, who is online and meets the exchange condition, to be served as a primary target client, and searching the memory module for one or more clients, who are other than the primary target client and meet the exchange condition, to be served as one or more false target clients;
- (d) the central processing module sending identity data of the primary target client as well as identity data of the false target clients by way of the communication module to the intelligent communication device, and receiving/sending exchange information by way of the communication module between the requesting client and the primary target client;
- (e) the evaluation module capable of evaluating a communication level between the requesting client and the primary target client and, when the communication level reaches a predetermined threshold, issuing a privileged instruction to the authorization module, which allows a message to be sent to the intelligent communication device via the communication module to inform the requesting client of obtaining a delete privilege, and allows the message to be logged in the memory module; and
- (f) the central processing module deleting at least one of the false target clients and then sending the identity data of the remaining false target clients as well as the identity data of the primary target client to the intelligent communication device of the requesting client via the communication module when receiving a delete request from the requesting client obtaining the delete privilege.

8. The method of claim 7, wherein the evaluation module includes a clock unit capable of generating periodic pluses, and a time calculation unit, and wherein step (e) includes the following sub-steps:

(e1) the time calculation unit counting the periodic pulses over a period in which the requesting client communicates with the primary target client to obtain a time value which indicates the communication level; and (e2) the evaluation module deciding whether or not the communication level has reached a predetermined threshold according to the time value.

9. The method of claim 7, wherein the evaluation module includes an information counting unit, and wherein step (e) includes the following sub-steps:

(e3) the information counting unit counting pieces of exchange information transferred between the requesting client and the primary target client to obtain a total amount of information, which indicates the communication level; and (e4) the evaluation module deciding whether or not the communication level has reached a predetermined threshold according to the total amount of information.

\* \* \* \* \*